United States Patent
Aerts et al.

(10) Patent No.: US 10,200,429 B2
(45) Date of Patent: Feb. 5, 2019

(54) EFFICIENT AND SCALABLE CACHING AND REPRESENTATION OF MEDIA WITH CROSS-SIMILARITIES

(71) Applicant: ALCATEL LUCENT, Boulogne-Billancourt (FR)

(72) Inventors: Maarten Aerts, Antwerp (BE); Patrice Rondao Alface, Antwerp (BE); Vinay Namboodiri, Mumbai (IN)

(73) Assignee: ALCATEL LUCENT, Boulogne Billancourt (FR)

( * ) Notice: Subject to any disclaimer, the term of this patent is extended or adjusted under 35 U.S.C. 154(b) by 109 days.

(21) Appl. No.: 15/117,968

(22) PCT Filed: Feb. 9, 2015

(86) PCT No.: PCT/EP2015/052577
§ 371 (c)(1),
(2) Date: Aug. 10, 2016

(87) PCT Pub. No.: WO2015/121180
PCT Pub. Date: Aug. 20, 2015

(65) Prior Publication Data
US 2016/0359934 A1 Dec. 8, 2016

(30) Foreign Application Priority Data
Feb. 11, 2014 (EP) .................................. 14305178

(51) Int. Cl.
*G06F 15/173* (2006.01)
*H04L 29/06* (2006.01)
(Continued)

(52) U.S. Cl.
CPC ........ *H04L 65/4084* (2013.01); *H04L 65/602* (2013.01); *H04L 65/607* (2013.01);
(Continued)

(58) Field of Classification Search
CPC . H04L 65/4084; H04L 65/602; H04L 65/607; H04N 21/222; H04N 21/23106;
(Continued)

(56) References Cited

U.S. PATENT DOCUMENTS 6,683,993 B1 * 1/2004 Mead ..................... H04N 19/20
375/E7.076
9,137,528 B1 * 9/2015 Wu ......................... H04N 19/90
(Continued)

OTHER PUBLICATIONS

International Search Report for PCT/EP2015/052577 dated Apr. 28, 2015.
(Continued)

*Primary Examiner* — Jonathan A Bui
(74) *Attorney, Agent, or Firm* — Fay Sharpe LLP

(57) ABSTRACT

A system for making available at an end-user a media file, from a media provider comprising a media file patch related to at least one object, the system comprising: an encoding module at the media provider configured for determining at least one representation which resembles the media file patch, by comparing the media file patch with representations of said at least one object, and for including at least one identification corresponding with said representation in a skeleton file; a storage medium storing a dictionary including the representations of the at least one object at of the end-user and an intermediate node between the media provider and/or the end-user; a decoding module configured for decoding the skeleton file using the identification for looking up the corresponding representation in the dictionary of the storage medium and for rendering the media file patch based on the looked-up corresponding representation.

20 Claims, 10 Drawing Sheets

(51) Int. Cl.
*H04N 21/222* (2011.01)
*H04N 21/231* (2011.01)
*H04N 21/2662* (2011.01)
*H04N 21/433* (2011.01)
*H04N 21/6336* (2011.01)
*H04N 21/858* (2011.01)

(52) U.S. Cl.
CPC ..... *H04N 21/222* (2013.01); *H04N 21/23106* (2013.01); *H04N 21/2662* (2013.01); *H04N 21/4331* (2013.01); *H04N 21/6336* (2013.01); *H04N 21/858* (2013.01)

(58) Field of Classification Search
CPC ........... H04N 21/2662; H04N 21/4331; H04N 21/6336; H04N 21/858
See application file for complete search history.

(56) References Cited

U.S. PATENT DOCUMENTS

| | | | | |
|---|---|---|---|---|
| 9,167,274 | B1* | 10/2015 | Gu | H04N 19/97 |
| 2007/0050411 | A1* | 3/2007 | Hull | G06F 17/3002 |
| 2012/0169923 | A1* | 7/2012 | Millar | H04N 19/23 348/399.1 |
| 2012/0288015 | A1* | 11/2012 | Zhang | H04N 7/54 375/240.26 |
| 2013/0028330 | A1* | 1/2013 | Zhang | G06T 1/00 375/240.22 |
| 2013/0170541 | A1 | 7/2013 | Pace et al. | |
| 2013/0275549 | A1* | 10/2013 | Field | G06F 17/30887 709/217 |
| 2013/0295961 | A1* | 11/2013 | Lehtiniemi | H04W 4/21 455/456.3 |
| 2014/0003523 | A1* | 1/2014 | Soroushian | H04N 19/597 375/240.16 |
| 2014/0003799 | A1* | 1/2014 | Soroushian | H04N 9/8227 386/353 |
| 2016/0330479 | A1* | 11/2016 | Liu | H04N 19/597 |

OTHER PUBLICATIONS

Bakiras et al.; Increasing the Performance of CDNs Using Replication and Caching: A Hybrid Approach; Proceedings of the 19th IEEE International Parallel and Distributed Processing Symposium (IPDPS'05); Apr. 4-8, 2005; 10 pp.

Chaudhury et al.; Parametric Video Compression Using Appearance Space; 19th IEEE International Conference on Pattern Recognition; Dec. 8-11, 2008; 4 pp.

Chen et al.; Mining Appearance Models Directly from Compressed Video; The Twelfth ACM SIGKDD International Conference on Knowledge Discovery and Data Mining (SIGKDD'06); Aug. 20-23, 2006; 9 pp.

Schwarz et al.; Overview of the Scalable H.264/MPEG4-AVC Extension; IEEE International Conference on Image Processing; Oct. 8-11, 2006; 4 pp.

Hakeem et al.; An Object-based Video Coding Framework for Video Sequences Obtained from Static Cameras; Nov. 6-11, 2005; Proceedings of the 13th Annual ACM International Conference on Multimedia; Apr. 28, 2015; 10 pp.

PCT Pat. App. No. PCT/EP2015/052577; Written Opinion of the International Searching Authority, dated Apr. 28, 2015; 6 pp.

European Patent Application No. 14305178.7; Extended European Search Report; dated Jul. 3, 2014; 7 pp.

* cited by examiner

EFFICIENT AND SCALABLE CACHING AND REPRESENTATION OF MEDIA WITH CROSS-SIMILARITIES

FIELD OF INVENTION

The field of the invention relates to media file handling, and in particular to a system for making a media file from a media provider available to an end-user connected to the media provider through a communication network; a media provider apparatus; a method for encoding a media file; a method for decoding an skeleton file; a method for making a media file from a media provider available at an end-user; and a digital data storage medium.

BACKGROUND

More media, especially videos, get produced and consumed everyday. This means more storage is needed for the newly produced videos, and more bandwidth to serve the consumers. Techniques have been researched and implemented to overcome these difficulties, by reducing storage demand and bandwidth requirements. Traditionally, video coding uses self-similarities within a video to reduce its size; often, even only similarities within a GOP-block (Group Of Pictures). Also, caching has been introduced, to redistribute the bandwidth needs of specific media objects, hence with perfect self-similarity. Other known techniques use HAS (HTTP Adaptive Streaming).

SUMMARY

The object of embodiments of the invention is to provide media file handling with reduced bandwidth requirements.

According to a first aspect of the invention, there is provided a system for making a media file from a media provider available at an end-user. The end-user may be connected to the media provider through a communication network. The media file may comprising a media file patch related to at least one object. A media file may comprise one or more media file patches, representing parts of the media file. The system comprises an encoding module at the media provider. The encoding module is configured for determining at least one representation which resembles the media file patch. This determining is done by comparing the media file patch with representations of said at least one object. Each representation has an identification. The encoding module is further configured for including at least one identification corresponding with said at least one representation in a skeleton file. The system also comprises a storage medium, on which is stored a dictionary that includes the representations of the at least one object. The storage medium may be situated at at least one of the end-user and an intermediate node between the media provider and the end-user, or even be distributed across multiple locations including the end-user and/or intermediate nodes between the media provider and the end-user. The system further also comprises a decoding module, which is configured for decoding the skeleton file using the at least one identification for looking up the at least one corresponding representation in the dictionary of the storage medium. The decoding module is further configured for rendering the media file patch based on the looked-up at least one corresponding representation.

The decoding module may be located at at least one of the end-user and an intermediate node between the media provider and the end-user.

In this manner, less overall bandwidth is required, since representations are stored in storage media closer to the end-user. Moreover, by efficiently utilizing the cross-similarities across media files, the need for storage can be reduced, and possible future upscaling can be achieved.

Embodiments of the invention are based inter alia on the inventive insight that video coding techniques that better exploit cross-similarities between media files coupled with distributed and upgradable cached storage of representations which resemble the media files can realize the necessary reduction in storage demand and bandwidth requirements.

According to an embodiment, the representations of the object comprise precaptured samples of the object.

According to an embodiment, the encoding module can be configured for computing at least one coefficient corresponding to the determined at least one representation. The encoding module is further also configured for including said computed at least one coefficient in the skeleton file. The decoding module can further be configured for rendering the media file patch by approximating the looked-up at least one corresponding representation using said at least one coefficient from the skeleton file. Such coefficients may comprise one or more interpolation coefficients when the approximating comprises an interpolation operation, or one or more extrapolation coefficients when the approximating comprises an extrapolation operation, or one or more distance coefficients representing (optionally multidimensional) sample distances if the approximating is done by using one or more representations with gradient information to perform the rendering, or any combinations thereof. Typically such gradient information will be stored along with the representations in the dictionary. The skilled person will understand that the coefficients discussed can be used to approximate representations accordingly, and that approximations may be more or less exact.

In this manner, by using stored representations comprising precaptured samples of the object and transmitted coefficients, the bandwidth requirements may be reduced. If (by luck or deliberately) a media file (or a media file patch) that is to be made available at an end-user happens to be equal to one representation, which therefore resembles the media file, it can be sufficient to use only one coefficient, such as unity. However, in typical embodiments using interpolation at least two representations that resemble the media file (or a media file patch) are determined by the encoding module and one or more corresponding coefficients are used. Using gradients, the gradients may be included along with the representations, as indicated above, and the distance coefficients may be included in the skeleton file. A different representation (for a neighboring sample or for one farther away) may then be predicted by multiplying the gradient with the included distance coefficient. Alternatively, it is also possible to not include distance coefficients in the skeleton file, but to include the manifold location of the encoded representation and to have the decoding module calculate a distance coefficient.

According to another embodiment, each representation comprises a model of the object associated with a set of parameters. Said model may take the form of a parametric model, wherein mathematical parameters are used to define a form that the model should take.

In a further developed embodiment, the encoding module may be configured for determining at least one parameter for the model of the object, and for including said determined at least one parameter in the skeleton file. The decoding module may then be further configured for rendering the media file using the determined at least one parameter from the skeleton file.

In this manner, the use of parametric models may help to further reduce the storage requirements, since parametric models can be stored very efficiently.

Optionally, parametric models may be used together with interpolated precaptured samples to benefit of the advantages of both.

According to a preferred embodiment, the encoding module may be configured for obtaining a difference between the media file patch and a representation based on the determined at least one representation. The encoding module may also be further configured for encoding the obtained difference as a residual, representing the obtained difference between the media file patch and a representation based on the determined at least one representation. The encoding module may further also be configured for including the encoded residual in the skeleton file. The decoding module may then be configured for rendering the media file based on the encoded residual.

In this manner, a more correctly approximating reconstruction of the original media file patch is made possible.

According to possible embodiments, the storage medium stores a dictionary that includes representations of the object at a higher resolution and/or at a better quality level than was available when the media file was originally created. In this manner, media files may be output at a higher resolution or at an improved quality level than was available when the media file was originally captured, thereby allowing future-proof upscaling.

According to another aspect of the invention, there is provided a media provider apparatus comprising an encoding module, which is configured for comparing a media file patch with representations of said at least one object. Each representation has an identification. The encoding module is further configured for determining at least one representation which resembles the media file patch, and for including at least one identification corresponding with said at least one determined representation in a skeleton file. Furthermore, the media provider apparatus may comprise a transmission module configured for transmitting the skeleton file through a communication network to at least one of an end-user and an intermediate node between the media provider apparatus and the end-user.

According to another embodiment of the invention, the media provider apparatus may be configured such that each representation comprises a precaptured sample of the object. According to other embodiments, each representation may comprise a model of the object associated with a set of parameters. In some embodiments, each representation may even comprise a precaptured sample of the object as well as a model of the object associated with a set of parameters. In this manner, a reduction of the storage space needed and the bandwidth required may be achieved compared to previous approaches.

According to yet another embodiment, in the media provider apparatus, the encoding module is further configured for computing at least one coefficient corresponding to the determined at least one representation, and for including said computed at least one coefficient in the skeleton file.

For embodiments of the invention where each representation may comprise a model of the object associated with a set of parameters, the encoding module in the media provider apparatus may further be configured for determining at least one parameter for the model of the object, and for including said determined at least one parameter in the skeleton file.

According to a preferred embodiment of the invention, in the media provider apparatus, the encoding module is further configured for obtaining a difference between the media file patch and a representation based on the determined at least one representation, for encoding the obtained difference as a residual, and for including the encoded residual in the skeleton file.

According to another aspect of the invention, there is provided a encoding method for encoding a media file patch, which is related to at least one object, at a media provider and for transmitting information to at least one of an end-user and an intermediate node between the media provider and the end-user. Said information allows for the media file to be output at the end-user. Said method comprises comparing the media file patch with representations of said at least one object, each representation having an identification. Said method also comprises determining at least one representation which resembles the media file patch, and including at least one identification corresponding with said at least one determined representation in a skeleton file. Furthermore, the method also comprises transmitting the skeleton file through a communication network to at least one of an end-user and an intermediate node between the media provider and the end-user.

According to an embodiment of the encoding method disclosed above, each representation may comprise a precaptured sample of the object. Moreover, in some embodiments, the encoding method may further comprise computing at least one coefficient corresponding to the determined at least one representation, and including said computed at least one coefficient in the skeleton file. Such coefficients may comprise one or more interpolation coefficients, or one or more extrapolation coefficients, or one or more distance coefficients, or any combinations thereof, as discussed above. The skilled person will understand that the coefficients discussed can be used to approximate representations accordingly, and that approximations may be more or less exact.

According to another embodiment, the encoding method disclosed above may comprise obtaining a difference between the media file patch and a representation based on the determined at least one representation. After obtaining the difference, it may be encoded as a residual. The residual may then be included in the skeleton file.

According to another aspect of the invention, there is provided a decoding method for decoding a skeleton file. Said method comprises receiving at an end-user or at an intermediate node between a media provider and the end-user a skeleton file. The skeleton file may include at least one identification corresponding with at least one representation of an object. Also, the method comprises storing a dictionary including representations of the object at at least one of an end-user and an intermediate node between a media provider and the end-user. Furthermore, the method comprises decoding the skeleton file related to the object, by using the at least one identification for looking up the at least one corresponding representation in the dictionary. Finally, the method may also comprise rendering the media file patch based on the at least one corresponding representation. If necessary, the media file may then be reconstructed using the rendered media file patch or patches.

According to an embodiment of the decoding method disclosed above, each representation may comprise a pre-captured sample of the object. Moreover, in some embodiments, the decoding method may further comprise computing at least one coefficient corresponding to the determined at least one representation, and including said computed at least one coefficient in the skeleton file.

In a preferred embodiment of the decoding method disclosed above, the skeleton file further includes a computed at least one coefficient and/or an encoded residual. The provided method then further comprises generating the media file patch by approximating the looked-up at least one corresponding representation using the at least one coefficient from the skeleton file and/or using the encoded residual.

In this manner, a more correctly approximating reconstruction of the original media file patch is made possible.

According to embodiments of the encoding and decoding methods disclosed above, each representation comprises a model of the object associated with a set of parameters. In some embodiments, the encoding method may then further comprise determining at least one parameter for the model of the object, and including said determined at least one parameter in the skeleton file. In some typical embodiments of the decoding method disclosed above, wherein the skeleton file includes a determined at least one parameter, the method may further comprise rendering the media file patch using the determined at least one parameter from the skeleton file.

According to another aspect of the invention, there is provided a method for making a media file from a media provider available at an end-user connected to the media provider through a communication network comprising embodiments of any encoding method disclosed above, and embodiments of any decoding method disclosed.

Another aspect of the invention related to a digital data storage medium encoding a machine-executable program of instructions to perform any one of the steps of the methods disclosed above.

According to another aspect of the invention, there is provided a computer program product comprising computer-executable instructions for performing any of the methods disclosed above, when the program is run on a computer.

Yet another aspect of the invention related to an intermediate node of a communication network, between a media provider and an end-user, comprising a storage medium storing a dictionary including representations of an object, said dictionary being suitable for use with the method of any one of the previously discussed embodiments.

The skilled person understands that the media file referred to in the present application may contain one or more media file patches. Further each media file patch may be related to one or more objects. The media file patches do not have to be adjacent portions with the same size. E.g., a media file showing two persons appearing in front of a background may be split in three media file patches: a $1^{st}$ media file patch for the $1^{st}$ person, a $2^{nd}$ media file patch for the $2^{nd}$ person and a $3^{rd}$ media file patch for the background. Another way may be to split the media file into two media file patches: a $1^{st}$ media file patch for both persons and a $2^{nd}$ media file patch for the background.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1:
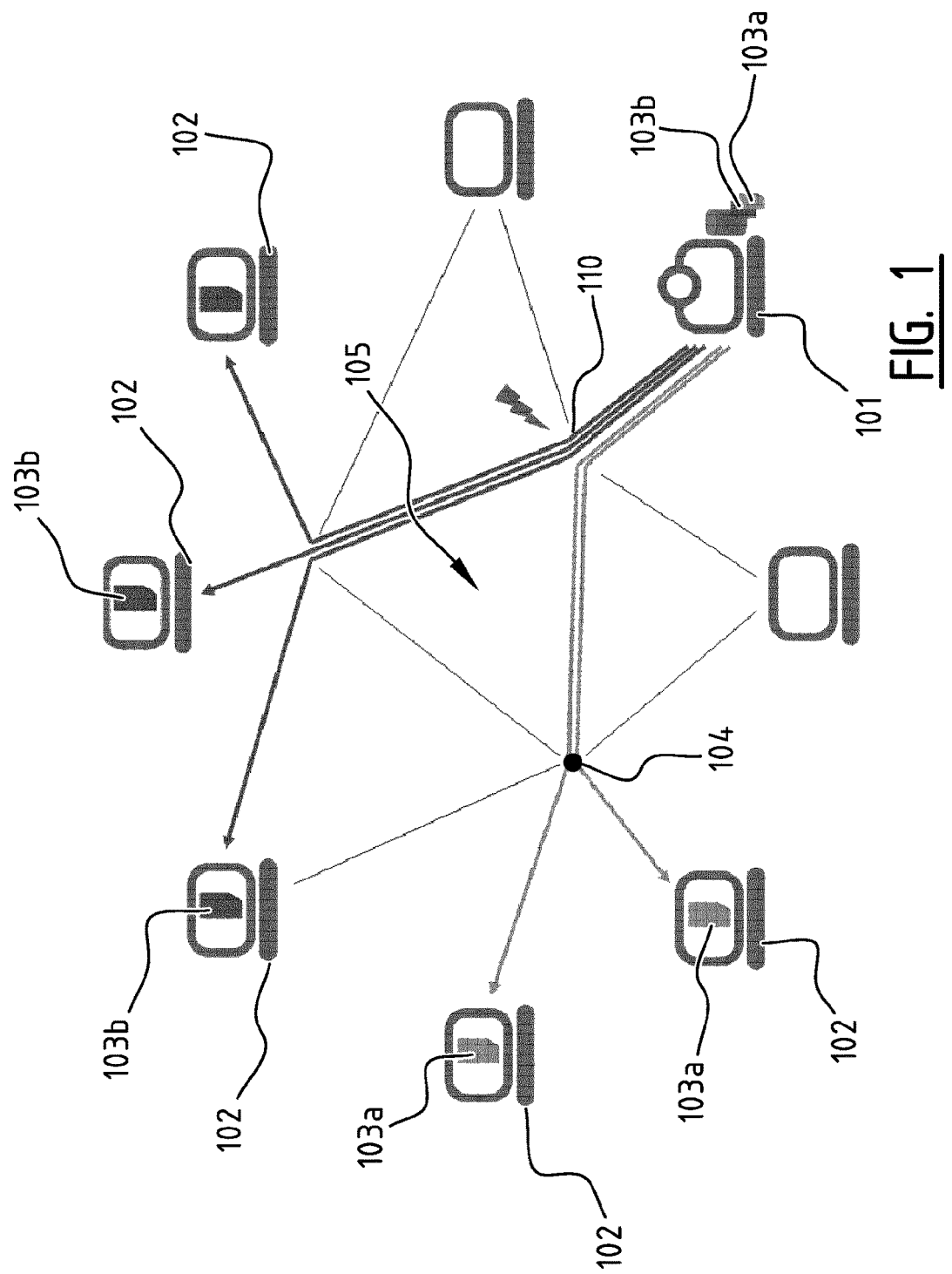
FIG. 1 illustrates schematically a prior art system for making a media file from a media provider available to end-users.

FIG. 1 illustrates schematically a system with a media provider 101 and end-users 102 connected to the media provider through a communication network 105 comprising intermediate network nodes 104. The illustrated system is configured for media file transmission, wherein two media files 103a-b are transmitted separately for every end-user or consumer 102 all the way from the media provider 101. Due to high bandwidth requirements, a bandwidth bottleneck 110 occurs at a link near the provider 101.

Figure 2:
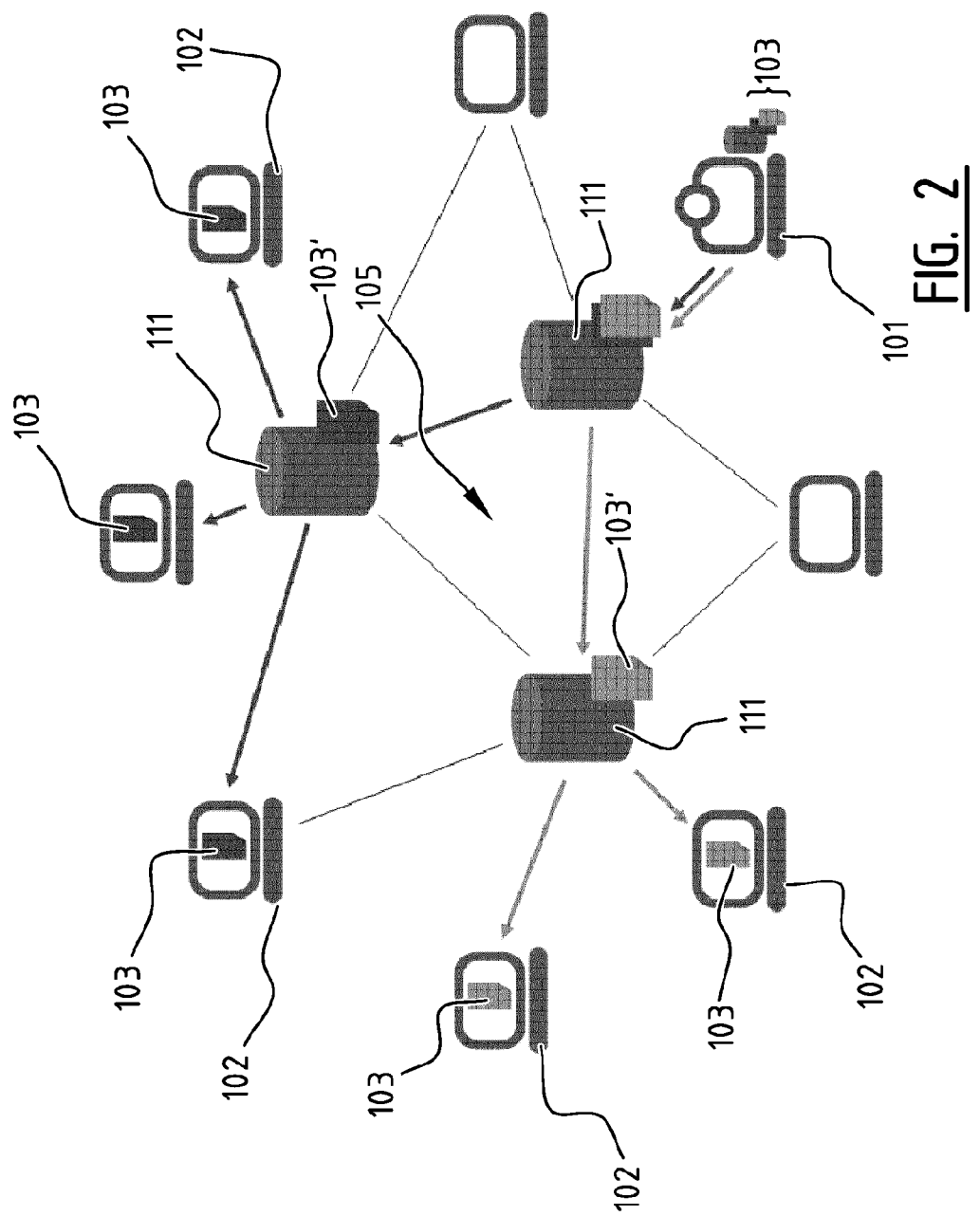
FIG. 2 illustrates schematically a system for making a media file from a media provider available to end-users, with the use of Content Delivery Network caches.

FIG. 2 illustrates schematically a system with a media provider 101 and end-users 102 connected to the media provider through a communication network 105 comprising intermediate network nodes 104. The illustrated system comprises Content Delivery Networks 111 (CDNs) to use caching to bring a once-produced media file 103 closer to the many end-user consumers 102. That way, the media file 103 does not have to be transmitted separately for every consumer 102 all the way from the producer's server 101 to the consumer's 102 rendering device. This would pose a bandwidth bottleneck at the producer's side, as shown in FIG. 1. Caching tries to alleviate this problem by putting copies 103' of the media file data that is in high demand at multiple servers close to the end-user. This may even happen at multiple levels of such caches, creating a hierarchical tree of synchronized copies. The consumer 102 will only have to download from the nearest cache copy in the hierarchy, reducing the need for bandwidth upstream. This only works for popular media objects. The cache copy is identical and only serves requests for that exact media object. It does not help in reducing the overall transmission bandwidth of other similar media objects. For instance, if one person watches a full season of a sitcom or if a sports fan watches all broadcasts of its favorite team, current CDNs have no tools to exploit the redundancy therein. Because media become more consumer than producer driven (i.e. the channels no longer define what the viewer watches, but the viewer gets to decide what and when), distributed caching based on big audiences becomes more and more irrelevant.

Figure 3:
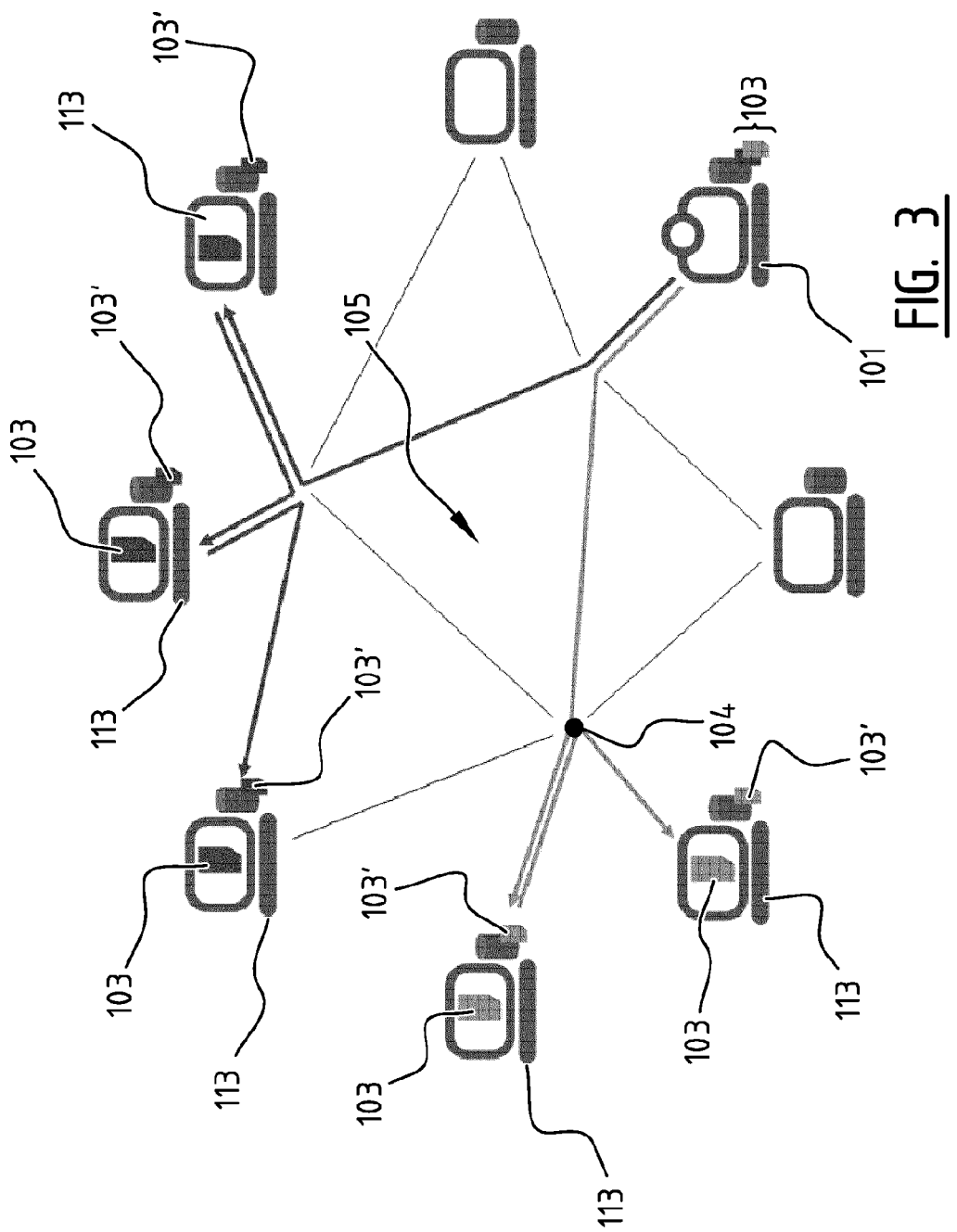
FIG. 3 illustrates schematically a system for making a media file from a media provider available to end-users, with the use of peer-to-peer strategies.

FIG. 3 illustrates schematically a system with a media provider 101 and end-users 113 connected to the media provider through a communication network 105 comprising intermediate network nodes 104. The illustrated system comprises the use of peer-to-peer strategies to transmit (and distribute) media content 103 from the media provider 101 to the end-users 113. In a way, this represents maximally distributed caching, by not creating a hierarchical tree of caches as in FIG. 2, but by allowing every consumer or end-user 113 to act as server or reproducer for a small subset 103' of the (identical) offered content. This way the bandwidth is distributed over the whole of the well-connected network in a more balanced way that doesn't suffer from the inherent bottlenecks of hierarchical caching strategies. This peer-to-peer solution has theoretical benefits on the consumer-producer level, but these benefits are difficult to realize in practice. The nodes in the underlying physical network are still hierarchically connected and are not peer-to-peer. The physical layer is the heritage of the TELCOs (Telecommunication Companies) and hence requires a huge investment to change. This is probably not going to change soon. However, this physical hierarchy differs from the consumer-producer hierarchy, so peer-to-peer solutions will solve the caching problem partially—at least until they hit their ceiling.

Figure 4:
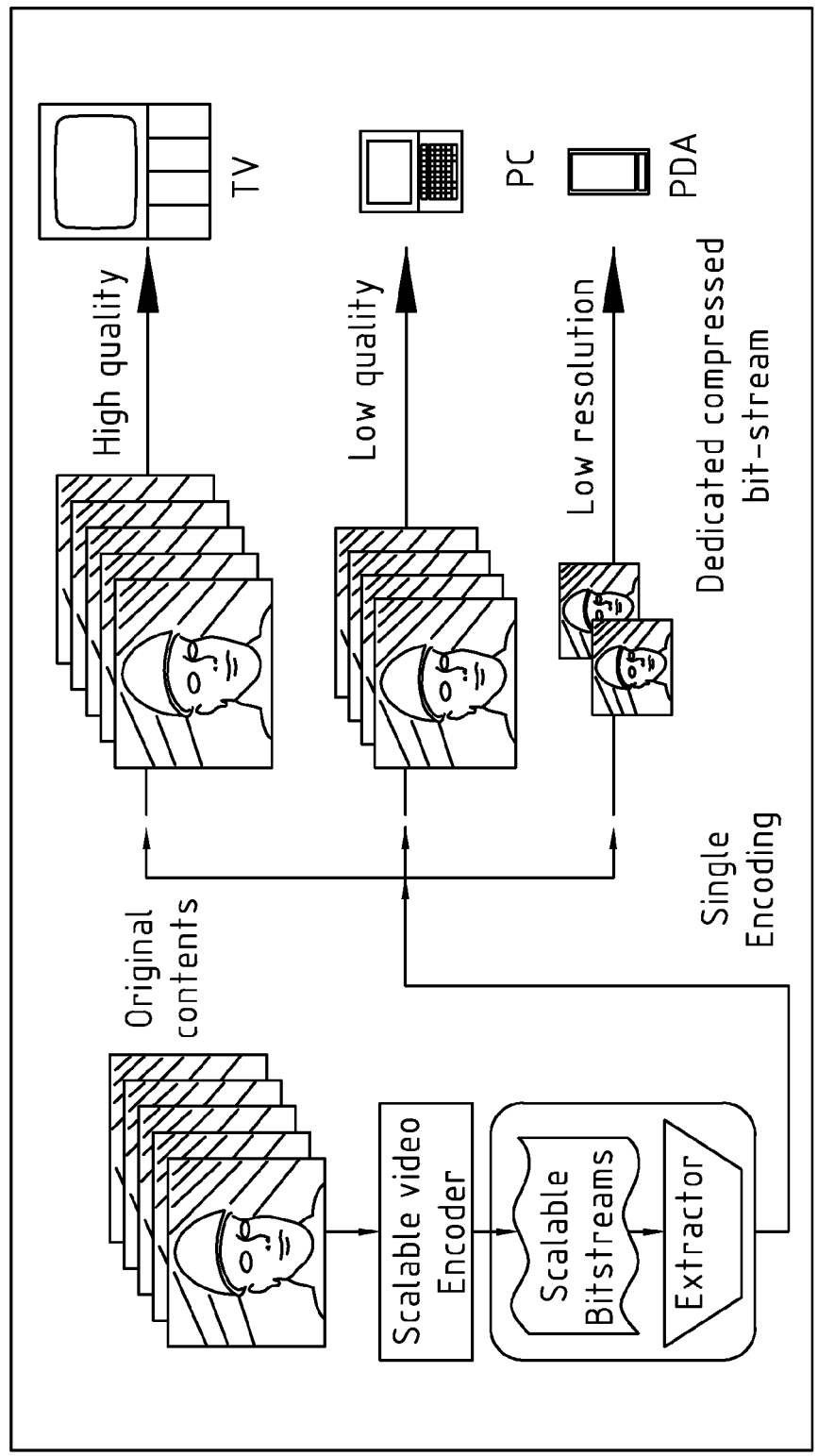
FIG. 4 illustrates schematically the use of Scalable Video Coding to offer content to consumers at several different quality requirements and/or resolutions.

FIG. 4 schematically illustrates the use of Scalable Video Coding to provide different resolution and different quality requirements. A known solution for having a video stream handle different resolutions or quality requirements is having a codec that sends packets in a layered approach. Each layer adds to the quality of the user experience. Low-resolution devices may choose to only receive packets from the base layers by dropping the high layer packets. As such, bandwidth is decreased. High-resolution devices with enough bandwidth may request to receive all packets. Anyway, scalability is uniform over the whole video and is within the range between the base layer and capture resolution. It is impossible to obtain other, higher resolutions, unless encoding and possibly capturing the content again.

Figure 5:
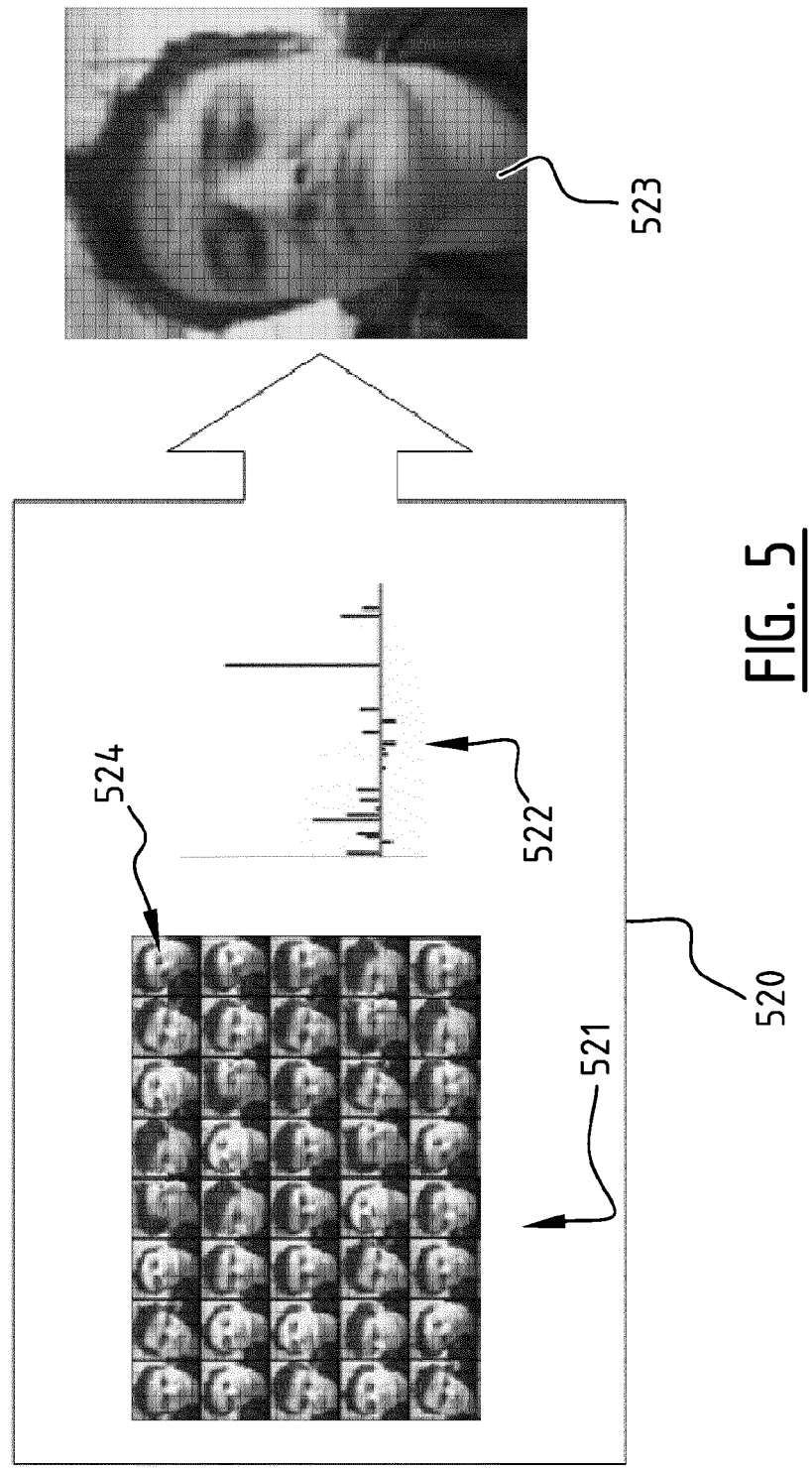
FIG. 5 illustrates schematically the use of appearance models to encode an image media file patch.
Figure 6:
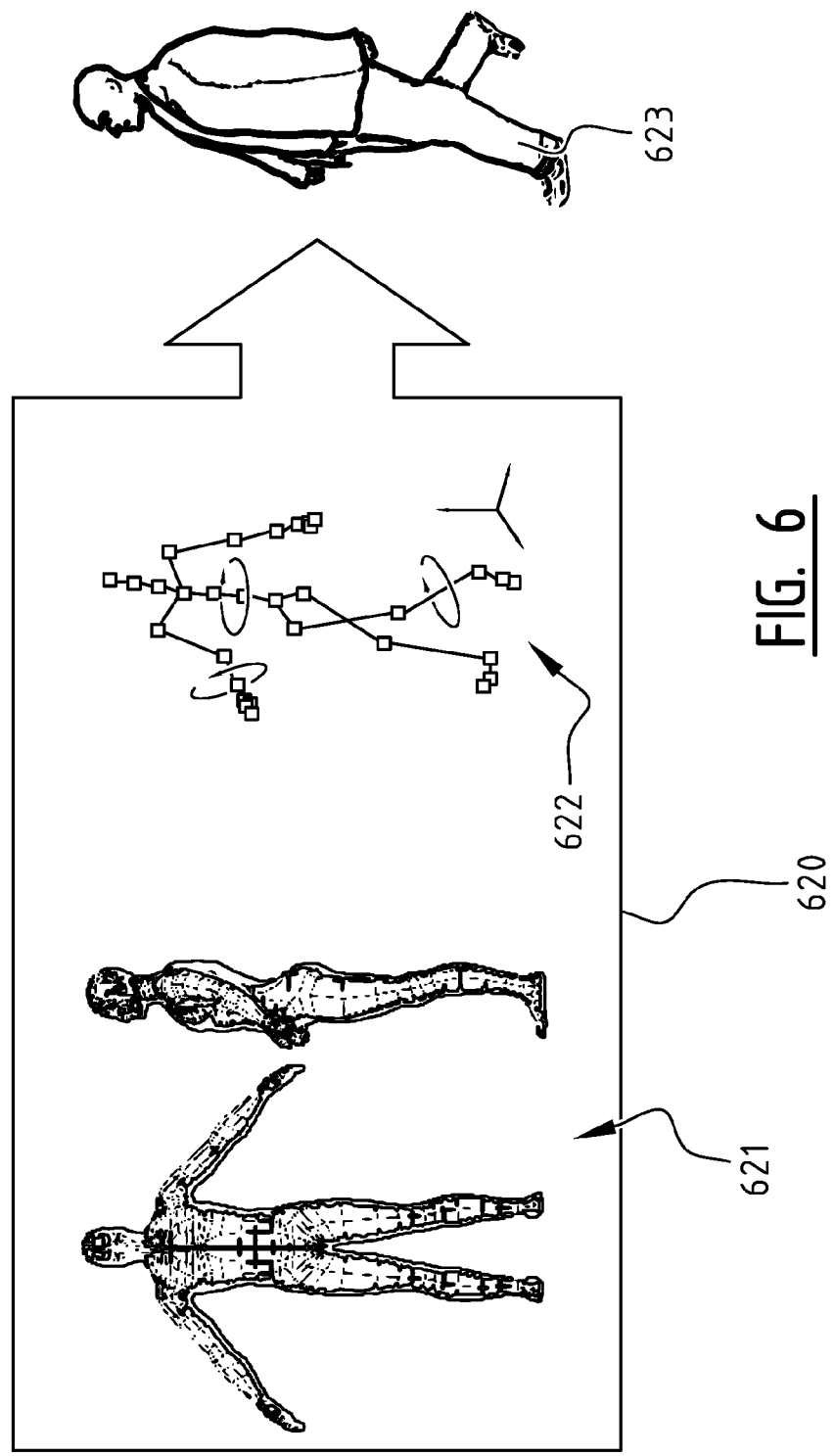
FIG. 6 illustrates schematically the use of parametric models to encode an image media file patch.

FIG. 5 illustrates schematically the use of appearance models to encode an image patch 523 as the interpolation 520 of several suitable precaptured samples 524 stored in a dictionary 521. In Computer Vision, appearance models are a way to capture an object's different appearances 524 under various conditions. This model is used for tracking, object detection, image classification and other Machine Learning problems. The appearance model comprises a dictionary 521 (stored on some storage medium) of many possible renderings of an object in different poses, different lighting conditions, different deformations, etc . . . . Such a database of examples is opposed to approaches that use a parametric rendering model, like rigged meshes for representation of 3D objects (as illustrated in FIG. 6) or parameterized texture generators for iterative parts of an image like sea waves, grass or foliage. Appearance models make sense because the appearances of objects are limited, often defining its identity. For instance, a face has eyes above a nose on top of a mouth. A different configuration would not be a face. Because the appearances occupy only a subspace, they can be captured in a model. However this subspace is continuous and dictionaries can not comprise all possible appearances. They will form a discretized version of it, a set of samples of appearances. These samples may be combined to interpolate the full continuous appearance subspace. Because interpolation techniques are limited (sometimes only linear combinations are regarded), the more samples the more accurate representation is possible. Depending on the available samples, it may be better to extrapolate from some samples, or to consider the gradients of one or more samples to predict neighboring samples. Because the number of samples is exponential with the degrees of freedom of the object (the samples lay in the product space thereof), special care needs to be taken to choosing what defines good objects for appearance models. A human may have too many degrees of freedom (arms, legs, fingers, face expression, etc) to capture every possible combination of poses. It may be good to split up the object in its parts. A more elegant way is to build a hierarchy of coarser sampled dictionaries for the whole of the object plus finer sampling of the different subparts. This way sampling density may be more balanced without the exponential increase of storage (and for our use case also transmission) size. The same is true for a generic-to-specific hierarchy (e.g. coarse sampling for any face, finer for male/female, even finer for a specific person). Recently, appearance models have been used to improve coding of videos. Such algorithms do not only scope the traditional P-frames for predicting the next, but build a dictionary for a specific object over the full length of the video. All samples in the dictionary may be used for prediction. If the size of the dictionary can be kept smaller than the size of the I-frames in MPEG-coding, appearance based coding has an advantage over it. This is the case for videos with high self-similarity over longer periods than the GOP-size. However, such self-similarity is rare.

FIG. 6 illustrates schematically the use of parametric models to encode a new image patch 623 from a rigged mesh 621 and its rig parameters 622. As stated above, appearance models form a complementary school of thought opposed to parametric models. The latter have all the same capabilities of rendering any appearance of an object under different conditions, but require a model of the generation process 620 to do so. For instance, a human may be represented by a 3D mesh with deformation information on how to adapt to different poses of legs, arms, etc. Parametric models are more flexible and need less memory. They also have some disadvantages, though. For many objects, such a parametric model does not yet exist, and creating one requires a lot of expert design. Therefore, parametric models are less suited for handling a generic class of videos with unknown objects. Also, retrieving interpolation parameters for appearance models is a far easier computational step than analyzing for the parameters of a rigged mesh. In a time where everyone can produce videos, fast encoding is important. Also, rendering an appearance model requires some lookups and a simple interpolation, while parametric models require mesh rendering, texturing, shading, etc . . . . Nevertheless, hybrid forms using representations that combine appearance models with parametric models are possible, and can lead to further reductions in bandwidth requirements.

Figure 7:
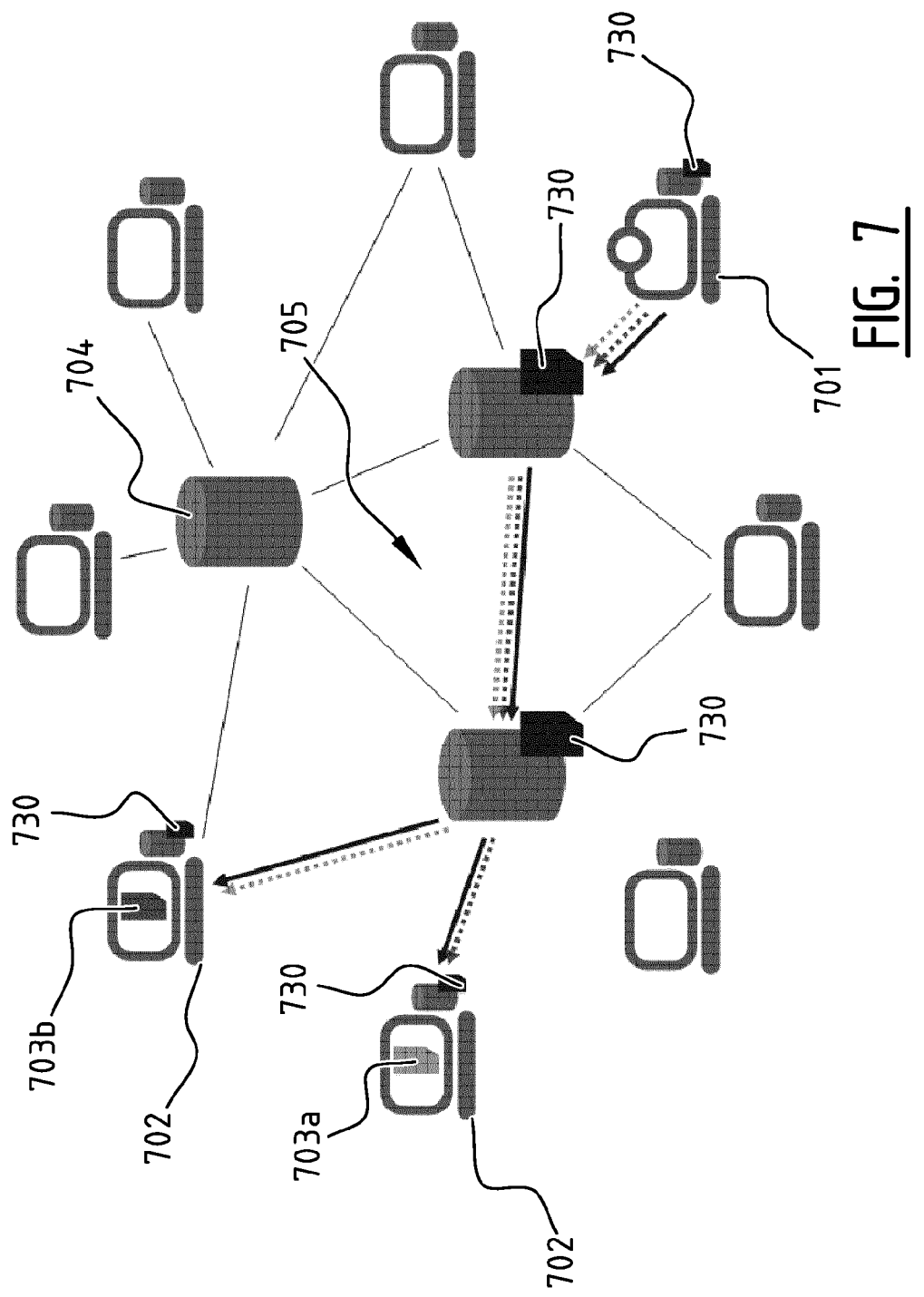
FIG. 7 illustrates schematically an embodiment of the invention of a system for making a media file from a media provider available to end-users, wherein cached dictionaries containing representations of objects shown in media files to be transmitted are used.

FIG. 7 illustrates schematically a system according to an aspect of the present invention, for making a media file 703 from a media provider 701 available at an end-user 702 connected to the media provider 701 through a communication network 705. The illustrated system comprises an encoding module at the media provider 701, storage media storing dictionaries 730 distributed across several intermediate nodes 704 and some end-users 702, and decoding modules at the end-users 702 or at the intermediate nodes 704. The media provider or producer 701 creates one or more dictionaries 730 (full arrow) that may be shared among several media files 703*a-b*, such as video files (dotted arrows). Consumer end-users 702 only have to download (part of) the dictionary 730 once from a nearby cache at an intermediate node 704 (or if necessary directly from the media provider 701 or from other end-users 702 in a peer-to-peer manner as above) and may use it to decode multiple video files 703*a-b*.

Figure 8A:
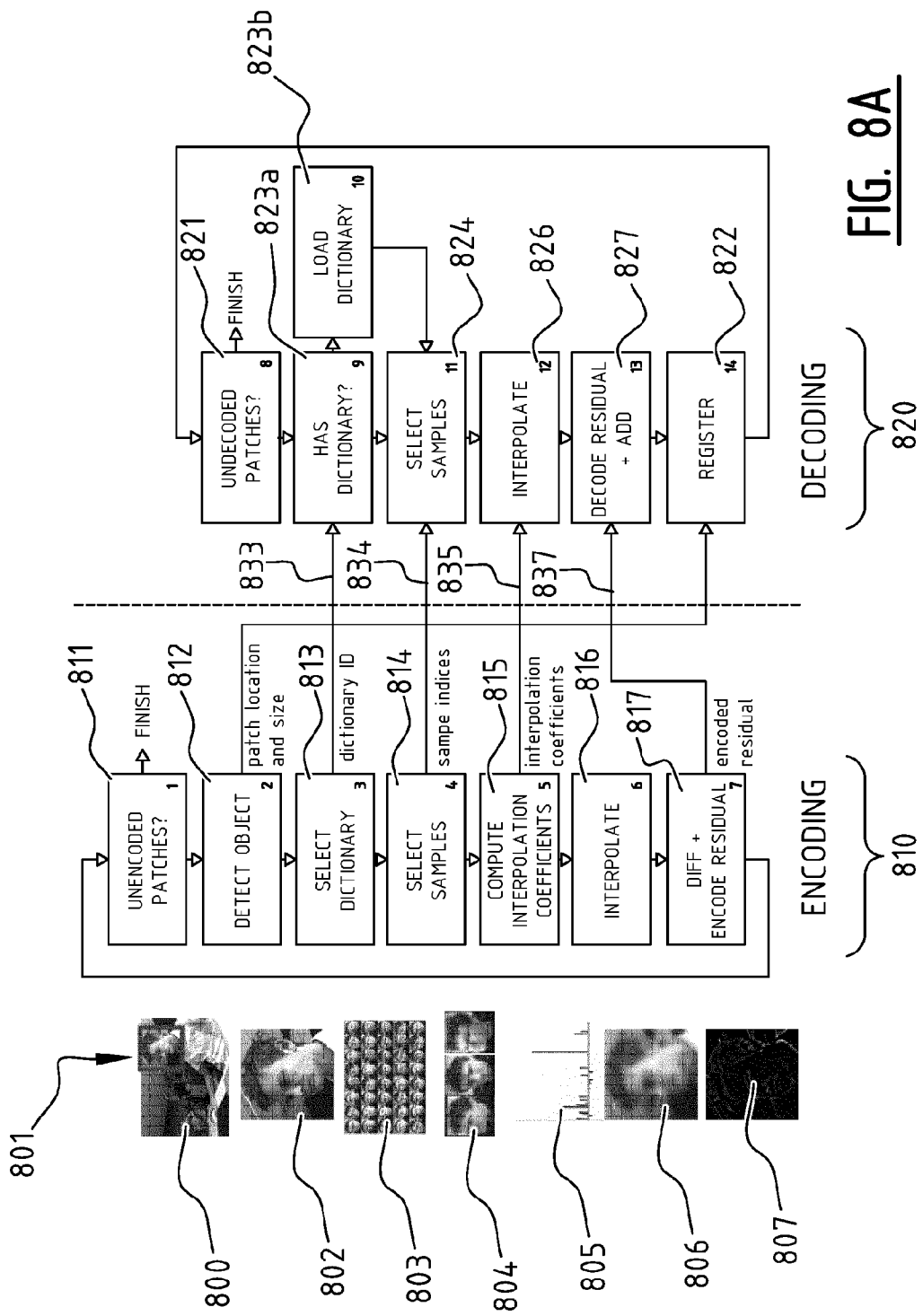
FIG. 8 illustrates schematically a flowchart representing an embodiment of a method of the invention for handling an image media file, with an encoder-decoder configuration with patch registration, interpolation and residual encoding.

FIG. 8A illustrates schematically a flowchart representing an embodiment of a method of the invention, for handling an image file 800. More specifically, an encoder-decoder configuration is shown, wherein an encoding method 810 and a decoding method 820 are combined. In this embodiment, an image media file 800 is first processed to detect 811 unencoded patches 801 (parts of an original media file) that are related to an object, and to determine 812 the patch location and the patch size, which may be transmitted 832 to an end-user or an intermediate node. To encode the media file patch 802, here the patch containing a person's face, the media file patch is compared with representations of one or more relevant objects, here one or more faces of a person 803. Each such representation is associated with an identification. Next, it is determined 813,814 which representation or representations resemble the media file patch.

These steps may comprise an optimization process, wherein the likeness of the media file patch related to at least one object and possible representations of said object may be optimized (maximally or sufficiently) to determine at least one suitable representation 804. In the case of encoding a media file patch containing a person's face when there are no (or insufficient) dictionaries available containing relevant and/or compatible representations, there are several options: a generic face dictionary can be used, optionally even adding samples of the current face; or a new specific dictionary can be created when encoding the person's face. The decision can be taken based on which option provides the most information gain, so as to have future media encoding benefit from the available dictionaries. Adding to existing dictionaries or creating new dictionaries can also be done independently of said insufficient availability.

Then, at least one identification corresponding with said at least one determined representation 804 may be included in a skeleton file that can be transmitted 833,834 through a communication network to an end-user or to an intermediate node, where the skeleton file may be decoded. In this embodiment, each representation 803 comprises a precaptured sample of the object, preferably under many different conditions. Also, in this embodiment one or more coefficients comprising interpolation coefficients 805 are computed 815 corresponding to the determined representations 804, and included in the skeleton file 835. After the computation, an interpolation 816 using the computed coefficients 805 is made to obtain a difference 807 between the interpolation 806 and the actual image file 802. This difference 807 is then encoded 817 as a residual, which may also be transmitted 837 (in the skeleton file, or separately) through the communication network to the end-user or intermediate node.

To decode the skeleton file, with the goal of reconstructing the media file, the end-user or an intermediate node may receive the skeleton file, which includes at least one identification corresponding with at least one representation of an object. By having a stored dictionary 823*a* (or loading a dictionary 823*b* if none is available) including representations 803 of the object at the end-user or at the intermediate node (or distributed amongst them), the skeleton file can be decoded or read by using the included identification 833,834 for looking up 824 the corresponding representation or representations 804 of the object in the dictionary 803. Using the corresponding representations 804, the media file patch may then be rendered. This process of finding appearance models corresponds to techniques known in the prior art, like the one used in FIG. 5. In this embodiment, the representations comprise precaptured samples of the object 804, which can be interpolated 826 with interpolation coefficients 805 included in the skeleton file 835. After the interpolation, an encoded residual included in the skeleton file 837 (or received separately) may be decoded and added 827 to the interpolation 806 to generate the media file patch 802. To ensure that the entire media file 800 is correctly reconstructed, in this embodiment there may also be received 832 a patch location and a patch size that correspond to the decoded media file patch 802, allowing the decoding method to register 822 the media file patch 801 at the correct location and at the correct size on a full image media file 800.

In this embodiment, extra functionality is added, such as the calculation 817 and addition 827 of an image difference encoded as a residual. Also, there is provided a partitioning 811 of the image 800 in image patches 801 that better correspond with stored representations 803 of objects shown on the image patch 802 and a detection 812 and registration 822 of patch location and patch size on the full image 800. In this manner, a larger image is partitioned into smaller patches, and the encoding and decoding methods shown here act on the media file patches rather than the entire image media files.

Figure 8B:
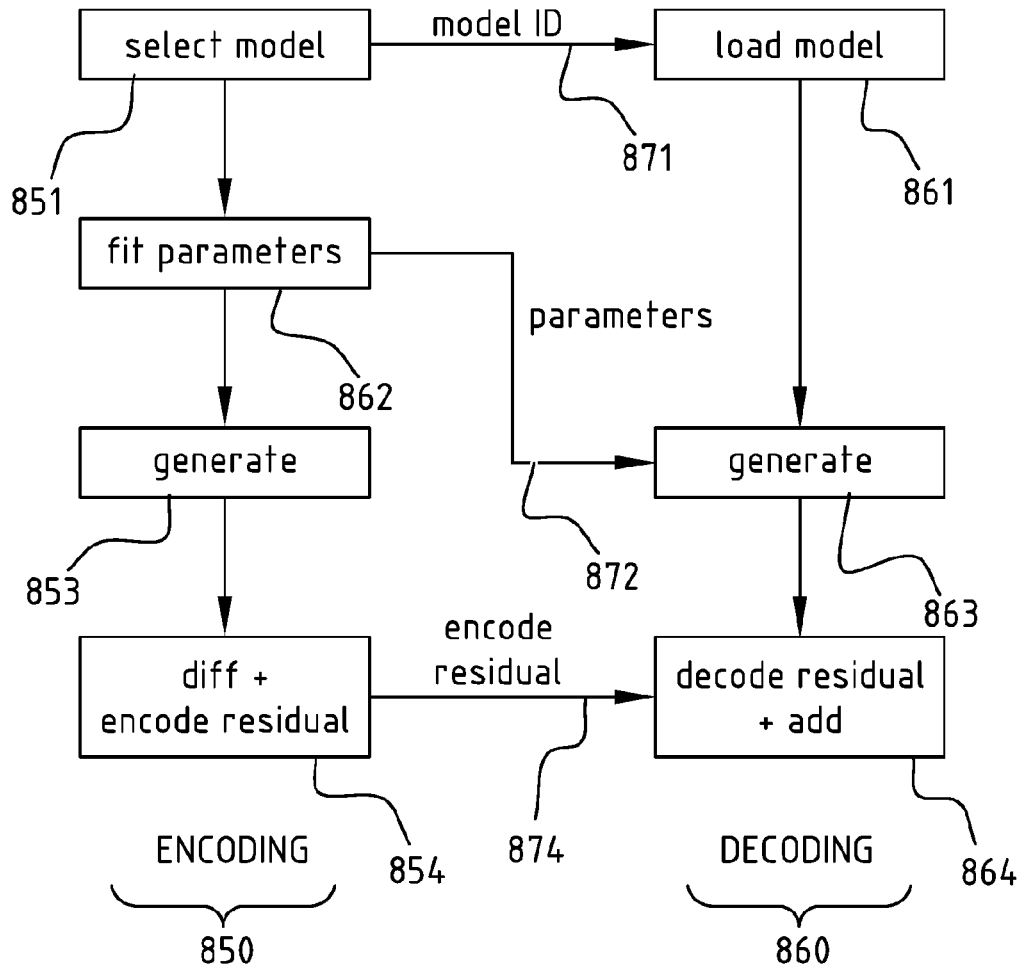

FIG. 8B illustrates schematically a flowchart representing an embodiment of a method of the invention, for handling an image media file (in this example the entire image media file constitutes one patch—the skilled person will appreciate that a media file may comprise one or more patches). More specifically, an encoder-decoder configuration is shown, wherein an encoding method 850 and a decoding method 860 are combined. In this embodiment, a representation is determined for an image media file, by comparing the image media file with possible representations of the object. Each such representation is associated with an identification. Next, it is determined 851 which representation or representations resemble the media file. These steps may comprise an optimization process, wherein the likeness of the media file related to an object and possible representations of said object may be optimized (maximally or sufficiently) to determine at least one suitable representation. Then, at least one identification corresponding with said at least one determined representation may be included in a skeleton file that can be transmitted 871 through a communication network to an end-user or to an intermediate node, where the skeleton file may be decoded. In this embodiment, each representation comprises a model of the object shown on the image media file, associated with a set of parameters. Also, in this embodiment one or more parameter values are determined by fitting the model 852 to the media file. The parameters may be included in the skeleton file 872. After the fitting 852, the parameters may be used to generate 853 an image of the object, and a difference may be obtained 854 between the generated image and the actual image file. This difference is also encoded 854 as a residual, which may also be transmitted 874 (in the skeleton file, or separately) through the communication network to the end-user or intermediate node.

To decode the skeleton file, with the goal of reconstructing the media file, the end-user or an intermediate node may receive the skeleton file, which includes at least one identification corresponding with at least one representation of an object, as well as a set of parameters. Having one or more representations of the object comprising a parametric model in a dictionary stored at the end-user or at the intermediate node (or distributed amongst them), the skeleton file can be decoded or read by using the included identification 871 for looking up 861 the corresponding parametric model(s) of the object in the dictionary. Using the corresponding parametric model(s) and the set of parameters, the media file may then be generated, using techniques known from the prior art, like the process shown in FIG. 6, where a parametric model 621 with associated parameter values 622 can be combined 620 to generate an image media file 623. In this embodiment, the representations comprise parametric models, for which values of the parameters included in the skeleton file 872 may be used to generate a media file 863. After the generating 863, an encoded residual included 874 in the skeleton file (or received separately) may be decoded and added 864 to the generated media file to better reconstruct the original media file.

Figure 9:
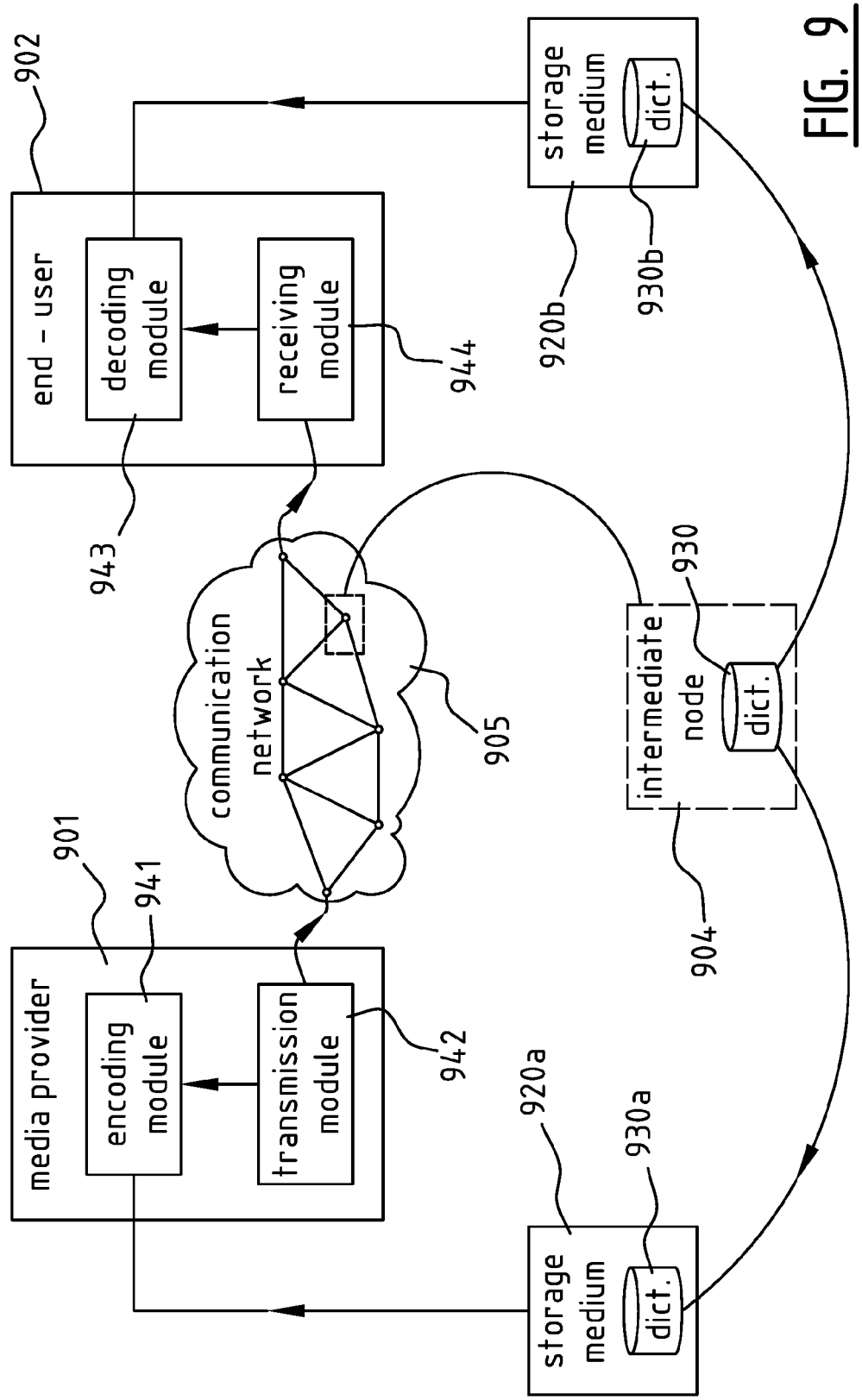
FIG. 9 illustrates schematically another embodiment of the invention of a system for making a media file from a media provider available to an end-user.

FIG. 9 illustrates schematically a system for making a media file, related to an object, from a media provider 901 available at an end-user 902 connected to the media provider 901 through a communication network 905. At the media provider 901, there are provided an encoding module 941 for encoding a media file and generating a skeleton file, and a transmission module 942 for transmitting the skeleton file to the end-user 902. The encoding module 941 is linked to a storage medium 920a containing a dictionary 930a including representations related to the object. At the end-user 902, there are provided a receiving module 944 for receiving the skeleton file from the media provider 901, and a decoding module 943 for decoding the skeleton file to regenerate the media file. The decoding module 943 is linked to a storage medium 920b containing a dictionary 930b including representations related to the object. In this embodiment, there are provided two physically separate storage media 920a-b containing two instances of the dictionary 930a-b, wherein both instances have been downloaded from the same intermediate node 904, functioning as a cache for the specific dictionary 930, but the skilled person will understand that other shared or distributed configurations of storage media and dictionaries may be implemented as well.

Embodiments of the invention applied to video transmission address cross-similar media like news programs with recurring anchors, sports game broadcasts, sitcoms with recurring cast and sets, but also nature documentaries and other content that follows a specific object for longer periods than prediction scopes of current coding methods, and where the similarity is not across media, but across larger portions of a single media file. Cross-media similarities are more complex than simple pixel-to-pixel or other local comparisons. When embodiments of the invention are exploited fully, i.e. when cross-similarity is in the scope for every possible object, they may even serve any type of video.

Embodiments with appearance models can capture the commonalities between multiple videos about similar subjects and store them in dictionaries close to the user. These cross-similarities, which comprise the biggest part of the video stream, only have to be sent once to serve multiple video files. The same applies for parametric models and hybrid models.

In embodiments the chances of finding self-similarities/redundancies within videos may increase when the prediction scope is broadened further and multiple videos about the same objects are considered. E.g. a common dictionary for the appearances of a news anchor's face may serve several years of news broadcasts. Such a dictionary may be too big of overhead for one-time appearance based coding, but it will probably not be too big for the 365 broadcasts in a year. If the consumer can efficiently access the dictionary, for instance from a cache as close as on his own rendering device (TV, laptop, phone, . . . ), bandwidth for transmission will be heavily reduced. This is the first time caching can be taken so close to the user and still make sense.

In embodiments a video object is no longer centralized in one file (or copies of it), but distributed over a file and several appearance dictionary databases containing precaptured samples of objects, and/or several dictionary databases containing models of objects associated with sets of parameters. The dictionaries may then comprise the recurring objects and the file may encode which dictionaries are to be loaded and which samples and interpolation coefficients or which models and which parameters or some combination thereof are required for prediction of each frame. The file may also encode a residual, like known prediction based coding techniques.

Note that dictionaries do not have to be loaded as a whole, but only subsets may have to be required. Encoding a file may be done in such a way that the subset is as small as possible, but when different subsets of a dictionary are often accessed, it may be worthwhile to load the whole object's dictionary once.

The amount of produced videos increases way more than linearly over the years, so keeping caches for every individual file will eventually not scale. The amount of different objects grows much slower. New actors appear and some new objects get invented, cityscapes change as do fashion trends, but this happens all at a much slower rate than the production of media content. Exploiting redundancies at this rate will scale for much longer than single media object redundancies. It will be possible to reuse dictionaries for many files. The number and size of dictionaries will (ideally) even be independent of the amount of produced media content. Embodiments of the invention can solve this problem.

Embodiments of the invention allow for coping with the range from having few learned dictionaries in the beginning to having a dictionary for every possible object. At the start, embodiments may only be able to encode files with high cross-similarities, but as more and more object appearances get learned, eventually content of all types benefits from the invention.

The advantages of embodiments of the invention will not only affect transmission, but also storage. Traditional caching only increases the memory storage demand by keeping copies of every file. Decentralizing storage (for instance using peer-to-peer technologies) cures the symptoms, but not the disease. Overall, with prior art solutions the total storage will remain the same, and at some point reaches its limit. Embodiments of the invention allow decreasing the total memory requirement, resulting in lower storage costs and a reduced carbon footprint.

Preferable embodiments of the invention have even more advantages. They allow scalable coding in resolution terms as well. The same interpolation coefficients or model parameters may be used in combination with a higher resolution version of the dictionaries to create a higher resolution rendering. In the future, rendering for higher resolution displays, or rendering for other types of displays like 3D-screens or holographic displays requires updating of the dictionary files, not of the content-specific files. This means that rendering becomes less dependent of the capture device. Content captured with a simple webcam may be rendered in HD or even in 3D if the objects in the content have such dictionaries (learned from other capture sources). Resolution scalability is also possible in another way. Having more accurate interpolation models or even just incorporating more samples in the interpolation function will result in a better, higher resolution representation, even from the same dictionary. An analogous benefit exists for parametric models and for hybrids thereof. Moreover, the required resolution for each object may be chosen separately and hence a limited bandwidth budget may be divided over salient and less relevant objects in a sensible manner.

A first embodiment describes how a media provider such as a sports broadcaster may use an embodiment of the invention to ensure lower bandwidth, lower storage requirements, scalable coding and guarantee future-proof encoding of old content, when new technologies emerge, without recapturing (which is impossible for sports games anyway). Let's consider soccer games. From a large set of available content, the broadcaster builds various dictionaries:

- a coarse generic human appearance model capturing the various poses of soccer players and different postures
- team-specific shirt samples from every angle, with different lighting conditions
- a generic head-model with enough samples to model different faces of players, different hairdo's, etc
- samples of small patches of different grass textures in different shades of green, some with line markings in different orientations
- samples of patches to create the audience
- stadium-specific samples
- a dictionary with patches to build the advertisement billboards In an embodiment, the sample dictionaries may be built by a clustering algorithm that ensures samples optimally discretize the object's appearance subspace. Samples should not look alike and all parts of the subspace should be sampled. Also, heavily frequented parts of the subspace may be sampled more densely for more accuracy. Algorithms for clustering samples in such subspaces include k-means clustering, hierarchical clustering or Gaussian Multivariate Models. High-dimensional subspaces may need some dimensionality reduction like Principal Component Analysis, Independent Component Analysis, Latent Semantic Analysis, or frequency transforms like Haar, Wavelet or Fourier transforms.

Embodiments may select a sparse set for interpolation and compute the interpolation coefficients, which is known as manifold learning. It may be done using k-Nearest Neighbor algorithms, Locally Linear Embedding, Gaussian Process Latent Variable Models, Multidimensional Scaling, Isomaps or Sparse Coding. The choice of the algorithm will depend on a good balance between speed and accuracy. Note that most encoding techniques of finding the coefficients are independent of decoding, so encoders having enough resources to do the more accurate Sparse Coding, produce files that may as easily be decoded by any device as a simpler encoding.

During each soccer match the broadcaster encodes a new skeleton file. In view of the use of different dictionaries, the file may include a header telling which dictionaries will be used for this specific game. An encoding module, here comprising a computer vision algorithm, determines which samples of which dictionary describe best each part of the camera feed, and includes IDs corresponding to those dictionaries and indices of those samples in the skeleton file, in much the same way as (part of) the encoding method shown in FIG. 8A. Field texture is best encoded using the field dictionary. Any other dictionary would yield a larger residual. Note that if the object is to guide prediction, it does not really matter if the patch actually is part of the soccer field. It is just well described that way. The encoding module also computes the interpolation coefficients that best match the patch, or match it sufficiently well if it is deemed unnecessary to find the best match. This is done for every part of the image, for every frame of the stream. Also, for every frame the residual difference between the predicted frame and the actual camera input is obtained and encoded. The resulting skeleton file then comprises a header, a concatenation of dictionary IDs, a set of sample indices and interpolation coefficients per patch and residual frames.

To decode such a stream, the consumer needs access to the dictionaries indicated by the header of the skeleton file. The consumer's device will know (or ask some online authority) which mirrors or caches are closest, from which to download the required dictionaries. The consumer's device may discover that the user consequently watches all games of a specific team and may decide to cache the corresponding shirt models and stadium-specific samples (and even the human pose model) locally on the device. If multiple versions of dictionaries exist, e.g. a low-resolution and a hi-resolution one, the device may determine the version that meets its needs. For every patch media file in the stream, the decoder will select the indicated set of samples from the indicated dictionary, use the coefficients to interpolate between them and decode and add the residual, in much the same way as (part of) the decoding method shown in FIG. 8A.

If the sports broadcaster later on discovers a way to capture the players in 3D, it may build such a dictionary for the players and users may view the same old sports content, but now on a 3D screen. The broadcaster also has the liberty to put different advertisement dictionary IDs in the headers of the skeleton file for different audiences or keep the advertisement dictionary up to date, without having to re-encode the whole stream.

Other embodiments require other dictionaries. A sitcom may require a dictionary for the face of each recurring cast member under different expressions, a dictionary that describes the set background (from a limited set of viewpoints and almost constant lighting). Other objects will only appear in one episode and the overhead of building a separate dictionary is too large. That may of course already have been done before for serving all sorts of other videos. It is nevertheless still possible to encode such parts with traditional predictive encoding; since they will only account for a small part of the video, they will not contribute too much to the size of the file.

As a third embodiment, a nature documentary needs dictionaries for different animals and plants and sceneries. The dictionary for the subject of the documentary, often the animal, will need dense sampling, maybe hierarchical from body to subparts, while the plants are less relevant and may be approximated more easily by using fewer samples. Note that especially in nature documentaries, the generic-to-specific hierarchy in dictionaries may be exploited: a cat looks a lot like a tiger. The common parts may be encoded in a common feline dictionary, while the class specific parts may be encoded in a specific cat and a specific tiger dictionary. This way the number of samples, and hence storage and transmission requirements, may be reduced.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the figures, including any functional blocks labelled as "processors" or "modules", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "module" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Whilst the principles of the invention have been set out above in connection with specific embodiments, it is to be understood that this description is merely made by way of example and not as a limitation of the scope of protection which is determined by the appended claims.

The invention claimed is:

1. A decoding apparatus, comprising:
at least one processor; and
at least one memory including computer program code;
the at least one memory and the computer program code configured to, with the at least one processor, cause the decoding apparatus to at least perform:
receiving a skeleton file for at least one media file patch of a media file from an encoding apparatus via a communication network, the skeleton file including at least one identification for at least one representation of an object with which said at least one media file patch is related and at least one residual for said at least one media file patch;
extracting from the skeleton file the at least one identification associated with the at least one representation and looking up at least one corresponding representation in a dictionary of a storage medium;
extracting from the skeleton file the at least one residual for said at least one media file patch;
decoding said at least one residual; and
rendering the at least one media file patch based on the looked-up at least one corresponding representation and the decoded residual.

2. The decoding apparatus of claim 1, wherein the at least one memory and the computer program code are configured to, with the at least one processor, cause the decoding apparatus to at least further perform:
rendering the at least one media file patch by first approximating the looked-up at least one corresponding representation using at least one coefficient from the skeleton file;
wherein said at least one coefficient comprises one or more of the following:
one or more interpolation coefficients;
one or more extrapolation coefficients; and
one or more distance coefficients.

3. The decoding apparatus of claim 1, wherein a plurality of representations are stored in at least one storage medium accessible to the decoding apparatus;
wherein the at least one memory and the computer program code are configured to, with the at least one processor, cause the decoding apparatus to at least further perform:
accessing the plurality of representations in conjunction with using the identification to look up the at least one representation.

4. An encoding apparatus, comprising:
at least one processor; and
at least one memory including computer program code;
the at least one memory and the computer program code configured to, with the at least one processor, cause the encoding apparatus to perform:
determining at least one representation which resembles at least one object of at least one media file patch of a media file, wherein the determining includes comparing the at least one object of the at least one media file patch with a plurality of representations of said at least one object, wherein the plurality of representations include the at least one representation, wherein each representation of the plurality of representations is associated with a unique identification;
including the at least one identification corresponding with said at least one determined representation in a skeleton file for the at least one media file patch; and
transmitting the skeleton file via a communication network to at least one of an end-user and an intermediate node between the encoding apparatus and the end-user.

5. The encoding apparatus of claim 4, wherein the plurality of representations are stored in at least one storage medium accessible to the encoding apparatus;
wherein the at least one memory and the computer program code are configured to, with the at least one processor, cause the encoding apparatus to at least further perform:
accessing the plurality of representations in conjunction with determining the at least one representation resembles the at least one media file patch.

6. The encoding apparatus of claim 4, wherein the plurality of representations comprise a corresponding plurality of precaptured samples of the object.

7. The encoding apparatus of claim 4, wherein the at least one memory and the computer program code are configured to, with the at least one processor, cause the encoding apparatus to perform:

computing at least one coefficient corresponding to the at least one representation; and including the at least one coefficient in the skeleton file;

wherein said at least one coefficient comprises one or more of the following:
one or more interpolation coefficients;
one or more extrapolation coefficients; and
one or more distance coefficients.

8. The encoding apparatus of claim 4, wherein the at least one representation comprises a model of the object associated with a set of parameters;

wherein the at least one memory and the computer program code are configured to, with the at least one processor, cause the encoding apparatus to perform:

determining at least one parameter for the model of the object; and including the at least one parameter in the skeleton file.

9. The encoding apparatus of claim 4, wherein the at least one memory and the computer program code are configured to, with the at least one processor, cause the encoding apparatus to perform:

obtaining a difference between the at least one media file patch and a generated image of the object based on the at least one representation;

encoding the obtained difference as a residual; and including the encoded residual in the skeleton file.

10. A method for encoding at least one media file patch of a media file, comprising:

determining at least one representation which resembles at least one object of at least one media file patch of a media file, wherein the determining includes comparing the at least one object of the at least one media file patch with a plurality of representations of said at least one object, wherein the plurality of representations include the at least one representation, wherein each representation of the plurality of representations is associated with a unique identification;

including the at least one identification corresponding with said at least one determined representation in a skeleton file for the at least one media file patch; and transmitting the skeleton file from an encoding apparatus via a communication network to at least one of an end-user and an intermediate node between the encoding apparatus and the end-user.

11. The method of claim 10, wherein the plurality of representations comprise a corresponding plurality of pre-captured samples of the object.

12. The method of claim 10, further comprising:

computing at least one coefficient corresponding to the determined at least one representation; and including said at least one coefficient in the skeleton file;

wherein said at least one coefficient comprises one or more of the following:
one or more interpolation coefficients;
one or more extrapolation coefficients; and
one or more distance coefficients.

13. The method of claim 10, further comprising:

obtaining a difference between the at least one media file patch and the determined at least one representation;

encoding the obtained difference as a residual; and including the encoded residual in the skeleton file.

14. A non-transitory computer-readable medium comprising program instructions for causing an encoding apparatus to perform the method of claim 10.

15. The method of claim 10, wherein the plurality of representations are stored in at least one storage medium accessible to the encoding apparatus, the method further comprising:

accessing the plurality of representations in conjunction with determining the at least one representation resembles the at least one media file patch.

16. The method of claim 10, wherein the at least one representation comprises a model of the object associated with a set of parameters, the method further comprising:

determining at least one parameter for the model of the object; and including the at least one parameter in the skeleton file.

17. A method for decoding a skeleton file for at least one media file patch of a media file, said method comprising:

receiving a skeleton file for at least one media file patch of a media file from an encoding apparatus at a decoding apparatus via a communication network, the skeleton file including at least one identification for at least one representation of an object with which the at least one media file patch is related and at least one residual for said at least one media file patch;

extracting from the skeleton file the at one identification associated with the at least one representation and looking up the at least one corresponding representation in a dictionary of a storage medium;

extracting from the skeleton file the at least one residual for said at least one media file patch;

decoding said at least one residual; and rendering the at least one media file patch based on the looked-up at least one corresponding representation and the decoded residual.

18. The method of claim 17, wherein the skeleton file includes a computed at least one coefficient, further comprising:

rendering the at least one media file patch by approximating the looked-up at least one representation using the at least one coefficient from the skeleton file and/or using the encoded residual;

wherein said at least one coefficient comprises one or more of the following:
one or more interpolation coefficients;
one or more extrapolation coefficients; and
one or more distance coefficients.

19. The method of claim 17, further comprising:

rendering the at least one media file patch using an encoded residual from the skeleton file, the residual having been encoded by the encoding apparatus after obtaining a difference between the media file patch and a generated image of the object based on the at least one representation.

20. A non-transitory computer-readable medium comprising program instructions for causing a decoding apparatus to perform the method of claim 17.

* * * * *